UNITED STATES PATENT OFFICE.

ANTENOR SALA, OF MEXICO, MEXICO.

PRODUCING PERMANENT, INSOLUBLE, INCOMBUSTIBLE, AND WASHABLE COATINGS.

963,810.     Specification of Letters Patent.     Patented July 12, 1910.

No Drawing.     Application filed February 12, 1907. Serial No. 357,011.

*To all whom it may concern:*

Be it known that I, ANTENOR SALA, a citizen of the Republic of Mexico, residing at the city of Mexico, Republic of Mexico, have invented certain new and useful Improvements in Producing Permanent, Insoluble, Incombustible, and Washable Coatings, of which the following is a specification.

The object of this invention is to provide a coating for surfaces, that will adhere permanently, be insoluble, incombustible, and washable, that will also be a non-conductor of heat and electricity and be unaffected by changes and differences in climate, temperature, or of the weather.

The object of the invention is also to provide a method of producing said coating *in situ.*

A coating having the above mentioned characteristics is of the utmost value, and especially where it is subjected to the action of heat, and in tropical climates.

In the practice of this invention, I apply in a certain improved manner, hereinafter described, two or more coats, by the latter of which the soluble constituents of the first coat or coats are fixed or rendered insoluble. If the finished surface is to be white, and if it be not necessary that the surface be well covered, I may use for the first coat or coats a solution of a silicate of an alkali metal—preferably a silicate of potash. I furnish it generally containing equal parts of water and commercial silicate of potash of 36°–40° B. If a white paint with more body be desired a neutral insoluble filler is to be added. If the surfaces are to be well covered and white or some other desired color, or black, I use for the first coat or coats my color paint. This is prepared by mixing thoroughly with water of ordinary purity a suitable amount of neutral insoluble fillers and pigments, or both, and adding thereto a quantity of a soluble silicate, preferably a silicate of potash, and stirring the mixture until this latter is thoroughly dissolved, and the mixture is homogeneous. The fillers and pigments, selected according to the use and color of the paint, should be preferably mineral, and of such a nature that they will not cause the formation of insoluble silicate or silica. They should also be carefully freed of all dirt and grit. The silicate preferably used in the liquid or color paint is the semi-solid commercial silicate of potash of 36° to 40° Baumé and preferably that which has been refined. For one of my white paints I may use the following proportions:

Calcium carbonate or whiting___ 425 parts
Silicate of potash, 36–40° B._____ 350 "
Water _____ 225 "

I do not confine myself to these proportions, however, and find it necessary to vary the composition of the mixture according to the color and conditions of the work. The mixing and solution are best made in quantities in the factory, but I may provide the pigments, fillers, and silicates mixed together in proper proportions for the color paint, or the commercial potassium silicate for the liquid, to which the water may be added by the user before application.

The solution which I use to fix and render the above mentioned coating insoluble consists of a soluble salt which by reacting upon the properly applied and properly set coat or coats, will produce an insoluble silicate having suitable properties. I find a solution of magnesium sulfate or chlorid to be best for this purpose, but do not restrict myself to these compounds. I provide preferably a solution of magnesium sulfate containing usually 2 parts of crystallized commercial magnesium sulfate dissolved in 16 parts of water; I may provide the dry salt, however, which is to be dissolved by the user.

Before painting walls, roofs or other surfaces with the first coating, they should, of course, be properly prepared by the removal of all old paint, varnish, resins, oil, rust, etc. The material or surface to be painted or coated should, of course, be dry, and if wood, should be well seasoned. The sealed packages of liquid and color paint for the first coating and the material for the fixing coating keep indefinitely in any climate, and when opened, the only alteration which can occur is the loss of water by evaporation. This should be replaced and the color paints be well mixed and diluted down with water or with thinner paint, if necessary, or with both, before the application, just as is customary with other paints.

In order that the coating may have the qualities of permanency, adherence, etc., above enumerated, it is necessary that the application of these solutions be made properly, and certain steps in the mode of application of paint are important in carrying out my improved method. In the first place, all walls or surfaces or plaster, mortar, brick or stone should be suitably cleaned, for example, with one or more coats of a solution of $2\frac{1}{2}$ parts of soap in 37 parts of boiling water. This is preferable where it is desired to secure a uniform coating of paint which will be free from spots, because walls or surfaces of this description are rarely, if ever, of uniform porosity. Cloth surfaces, fabrics, etc., should first be sized with a coat of one of my colorless or white paints; the first coat of color paint to be applied when this sizing coat is dry.

The surfaces having been prepared, as above described, the well mixed paints either white, colored, or colorless are applied with a clean, soft brush in a uniform coat or coats. Frequently more than one are preferable. Each successive coat should be applied soon after the previous one is set, and the extent of surface covered must be so selected that the various coats of paint, and the fixing material may be applied during the same day. On galvanized iron, iron roofs, etc., it is preferable to apply three coats of my color paint, the first coat lengthwise, the second crosswise and the third lengthwise.

The fixing coat should be applied rapidly with a clean brush five to ten minutes after the last coat of my paint has so set that on sweeping the hand or a dry brush lightly over the surface nothing adheres to it. The entire coat or covering has then "set" as I term it the outer surface forming a film nearly dry, and the rest of the covering being damp and soft. It is important to apply the fixing coat at this time, and in this manner, for if the fixing coat is applied while the first coat is wet, or before it has "set," the application of the second coat with a brush, or in any way that will rub the first coat, will destroy the continuity of the soluble silicate forming said coat, and if the second coat is not applied until after the first coat becomes dry, the second coat cannot properly penetrate the first coat nor react with the whole of the same, and the solution of the second coat will very quickly evaporate, leaving practically all the fixing salt on the surface of the first coat, and would be very rapidly washed off by a light rain or otherwise. Since the second or fixing coat cannot penetrate through the whole of the insoluble silicate coat if it is allowed to become thoroughly dry, it is of the utmost importance that the fixing coat be applied while the soluble silicates are still in solution. The only part of the insoluble silicates which is allowed to dry is the surface thereof, and this somewhat gelatinous surface or film should only be allowed to set or become dry enough so that the light application of the hand or brush will not destroy its continuity. Immediately after the second or fixing coat is applied, this film becomes softened or somewhat dissolved, to allow the fixing reagents to properly act upon the whole of the soluble silicate. It the soluble silicates were allowed to become thoroughly dry, they would not again become dissolved enough for the fixing reagents to thoroughly and entirely act upon the whole of them. And if the fixing solution does not react with the whole layer of soluble silicates, rain water or other dampness will readily penetrate through cracks, etc., in the coatings, and dissolve these soluble silicates and cause the paint to peel off. The coatings of soluble silicates usually become sufficiently set in from five to ten minutes after application, but if left for an hour or two they will, in general, become so thoroughly dry that the fixing coat will not properly react through the whole layer of soluble silicates. By applying the fixing material quickly, the soluble matter is rendered insoluble, even into the pores of the wood or the depressions of whatever surface to which the coatings may be applied.

The insoluble silicates formed by my improved method possess the proper physical qualities and degree of hydration which enable them to harden and bind the fillers, pigments, etc., firmly together and to the surface, and produce a permanent and uniform coating of superior adhering qualities and of a fine appearance.

It has been proven that my improved material when applied as a coating in the manner above described endures indefinitely under all weather conditions. It resists scaling off, and as a consequence of its permanency, it effects great economy not only in the initial cost of the material, but also by obviating frequent renewals, as is necessary with oil paints. The coating may be washed and disinfected, and is used, therefore, with advantage in tenement houses and dwellings, kitchens, toilet rooms, stables, etc. It is a very poor conductor of heat and is, of course, incombustible. It hinders, therefore, the spread of conflagration, as no combustible material can ignite so long as it is covered by said coating.

Coatings made in this manner have withstood the action of the tropical sun and weather for a long time. Structures thus covered, and especially when the coating is white are cooler than any other, because of the great reflecting power and poor heat conductivity of the insoluble silicate formed by my improved method.

What I claim as new and desire to secure by Letters Patent, is:

A method of producing upon a surface, a permanent, incombustible and washable covering, consisting in first applying to the surface a coating of a solution of silicate of potash and then, about five or ten minutes after this application and when the same has filmed and become partially dry, applying a solution of a magnesium salt for combining with the whole of the soluble silicate to form an insoluble silicate.

In testimony whereof, I have signed my name to this specification, in the presence of two subscribing witnesses.

ANTENOR SALA.

Witnesses:
C. J. THATCHER,
H. J. TEUFER.